United States Patent
Opdahl et al.

(10) Patent No.: US 12,052,641 B2
(45) Date of Patent: Jul. 30, 2024

(54) SYSTEM AND METHOD FOR REAL-TIME EXTRACTION AND PROCESSING OF VIDEO DATA FROM VEHICLES

(71) Applicant: Trimble Inc., Sunnyvale, CA (US)

(72) Inventors: Jon Opdahl, Phoenix, AZ (US); Vinay Babu, Pune (IN); Miadad Rashid, Minnetonka, MN (US); Christopher Orban, New Orleans, LA (US)

(73) Assignee: Trimble Inc., Sunnyvale, CA (US)

( * ) Notice: Subject to any disclaimer, the term of this patent is extended or adjusted under 35 U.S.C. 154(b) by 329 days.

(21) Appl. No.: 17/541,122

(22) Filed: Dec. 2, 2021

(65) Prior Publication Data
US 2023/0179970 A1 Jun. 8, 2023

(51) Int. Cl.
| | |
|---|---|
| *H04B 1/034* | (2006.01) |
| *G06N 20/00* | (2019.01) |
| *G06V 20/40* | (2022.01) |
| *G06V 20/56* | (2022.01) |
| *G06V 20/58* | (2022.01) |
| *H04W 4/02* | (2018.01) |

(Continued)

(52) U.S. Cl.
CPC .............. *H04W 4/44* (2018.02); *G06N 20/00* (2019.01); *G06V 20/44* (2022.01); *G06V 20/582* (2022.01); *G06V 20/588* (2022.01); *H04W 4/027* (2013.01); *H04W 4/38* (2018.02)

(58) Field of Classification Search
CPC ......... H04W 4/44; H04W 4/38; H04W 4/027; H04W 4/48; H04W 4/028; G06V 20/582; G06V 20/44; G06V 20/588; G06V 20/50; G06V 20/54

See application file for complete search history.

(56) References Cited

U.S. PATENT DOCUMENTS

| | | | |
|---|---|---|---|
| 11,328,247 B2 * | 5/2022 | Ivester | ................... H04L 51/10 |
| 11,735,050 B2 * | 8/2023 | Garg | ..................... G08G 1/164 |
| | | | 701/32.2 |
| 2021/0261140 A1 | 8/2021 | Kallepalle et al. | |

(Continued)

FOREIGN PATENT DOCUMENTS

WO 2017/123665 A1 7/2017

OTHER PUBLICATIONS

Extended European Search Report for Application No. 22209526.7-1218, date of completion of the search Mar. 31, 2023, 13 pages.

*Primary Examiner* — Tuan Pham
(74) *Attorney, Agent, or Firm* — Kilpatrick Townsend & Stockton LLP

(57) ABSTRACT

Systems and methods of video data extraction and processing from vehicles are described. The video data is captured using a video capture device at a vehicle. Sensor data is captured using one or more vehicle sensors at the vehicle. A data message is sent from the vehicle to a vehicle management server, the data message allowing the vehicle management server to access the video data and the sensor data. One or more model outputs are generated by providing the video data to one or more machine-learning models at the vehicle management server. An event record associated with an event is constructed based on the one or more model outputs using a vehicle rules engine. A vehicle management message is generated based on the event record and is sent to the vehicle.

20 Claims, 8 Drawing Sheets

(51) Int. Cl.
*H04W 4/38* (2018.01)
*H04W 4/44* (2018.01)

(56) References Cited

U.S. PATENT DOCUMENTS

2021/0279978 A1* 9/2021 Rich .................... G06K 7/1095
2023/0168100 A1* 6/2023 Widjaja ............. G08G 1/09626
                701/25

* cited by examiner

Message Template 454-1
<Driver Name>, we've detected some behavior to improve. Please take a moment to review the following information:

Message Template 454-2
On <Time/Date>, we detected that you were following another vehicle at <Seconds Following Distance>, for <Seconds Following Time>. Also, your speed was <MPH> at this time, which was <MPH> over the limit. Please always maintain a safe following distance, and it is critical to obey the posted speed limit. This is a very serious event and exposes both you and the company to risk. You will have very little time to react to any unexpected event, please reduce your speed and increase your following distance.

Message Template 454-3
<Driver Name>, we detected that you ran a stop sign. Also, your speed was <MPH> at this time. Please always come to a complete stop at each stop sign. This is a very serious event and exposes both you and the company to risk.

Message Template 454-4
<Driver Name>, thank you for all the great work you do for our company. Please stay safe out there on the road!

FIG. 4

SYSTEM AND METHOD FOR REAL-TIME EXTRACTION AND PROCESSING OF VIDEO DATA FROM VEHICLES

BACKGROUND OF THE INVENTION

Many vehicles are equipped with video capture technology that allows videos or image streams to be used to monitor the surroundings of the vehicles. While such video data may be processed onboard the vehicles, in many instances it can be advantageous to offload the data to remote computing systems for processing of the data. Offloaded data can be processed for a variety of purposes. For example, fleet vehicles such as trucks or other motor vehicles can capture a wide variety of data while being operated, and the captured data can be useful for a remote computing system to monitor and properly maintain the fleet vehicles.

SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a computer-implemented method comprising: capturing video data using a video capture device at a vehicle; capturing sensor data using one or more vehicle sensors at the vehicle; sending a data message from the vehicle to a vehicle management server, the data message allowing the vehicle management server to access the video data and the sensor data; generating one or more model outputs by providing the video data to one or more machine-learning models at the vehicle management server; constructing an event record associated with an event based on the one or more model outputs using a vehicle rules engine at the vehicle management server, wherein the vehicle rules engine is configured to apply one or more vehicle rules to the one or more model outputs; generating a vehicle management message based on the event record; and sending the vehicle management message from the vehicle management server to the vehicle.

Example 2 is the computer-implemented method of example(s) 1, further comprising: detecting the event based on one or both of the video data and the sensor data using onboard hardware at the vehicle; and sending an event detection message from the vehicle to the vehicle management server, the event detection message providing event data associated with the event.

Example 3 is the computer-implemented method of example(s) 2, further comprising: determining, at the vehicle management server, whether to send a data request message to the vehicle based on the event data; and sending the data request message from the vehicle management server to the vehicle.

Example 4 is the computer-implemented method of example(s) 3, wherein the data message is sent by the vehicle in response to the vehicle receiving the data request message.

Example 5 is the computer-implemented method of example(s) 1-4, wherein the one or more machine-learning models include a machine-learning model configured to detect lane lines, traffic signs, or other vehicles in the video data.

Example 6 is the computer-implemented method of example(s) 1-5, wherein the video data is retrieved from the vehicle and stored in a data store that is separate from the vehicle management server, and wherein the data message indicates a location of the video data in the data store.

Example 7 is the computer-implemented method of example(s) 1-6, wherein the one or more vehicle sensors include an accelerometer or a GNSS receiver, and wherein the sensor data includes acceleration data captured by the accelerometer or a geospatial location of the vehicle captured by the GNSS receiver.

Example 8 is the computer-implemented method of example(s) 1-7, wherein the event record is constructed further based on the sensor data.

Example 9 is a vehicle management system comprising: a vehicle management server; and one or more vehicles communicatively coupled to the vehicle management server, wherein each vehicle of the one or more vehicles is configured to: capture video data using a video capture device at the vehicle; capture sensor data using one or more vehicle sensors at the vehicle; send a data message to the vehicle management server, the data message allowing the vehicle management server to access the video data and the sensor data; wherein the vehicle management server is configured to: generate one or more model outputs by providing the video data to one or more machine-learning models at the vehicle management server; construct an event record associated with an event based on the one or more model outputs using a vehicle rules engine at the vehicle management server, wherein the vehicle rules engine is configured to apply one or more vehicle rules to the one or more model outputs; generate a vehicle management message based on the event record; and send the vehicle management message to the vehicle.

Example 10 is the vehicle management system of example(s) 9, wherein the vehicle is further configured to: detect the event based on one or both of the video data and the sensor data using onboard hardware at the vehicle; and send an event detection message to the vehicle management server, the event detection message providing event data associated with the event.

Example 11 is the vehicle management system of example(s) 10, wherein the vehicle management server is further configured to: determine whether to send a data request message to the vehicle based on the event data; and send the data request message to the vehicle.

Example 12 is the vehicle management system of example(s) 11, wherein the data message is sent by the vehicle in response to the vehicle receiving the data request message.

Example 13 is the vehicle management system of example(s) 9-12, wherein the one or more machine-learning models include a machine-learning model configured to detect lane lines, traffic signs, or other vehicles in the video data.

Example 14 is the vehicle management system of example(s) 9-13, wherein the video data is retrieved from the vehicle and stored in a data store that is separate from the vehicle management server, and wherein the data message indicates a location of the video data in the data store.

Example 15 is the vehicle management system of example(s) 9-14, wherein the one or more vehicle sensors include an accelerometer or a GNSS receiver, and wherein the sensor data includes acceleration data captured by the accelerometer or a geospatial location of the vehicle captured by the GNSS receiver.

Example 16 is the method of example(s) 9-15, wherein the event record is constructed further based on the sensor data.

Example 17 is a system comprising, one or more processors; and one or more computer-readable media comprising instructions that, when executed by the one or more processors, cause the one or more processors to perform operations comprising: capturing video data using a video capture device at a vehicle; capturing sensor data using one or more vehicle sensors at the vehicle; sending a data message from the vehicle to a vehicle management server, the data message allowing the vehicle management server to access the video data and the sensor data; generating one or more model outputs by providing the video data to one or more machine-learning models at the vehicle management server; constructing an event record associated with an event based on the one or more model outputs using a vehicle rules engine at the vehicle management server, wherein the vehicle rules engine is configured to apply one or more vehicle rules to the one or more model outputs; generating a vehicle management message based on the event record; and sending the vehicle management message from the vehicle management server to the vehicle.

Example 18 is the system of example(s) 17, wherein the operations further comprise: detecting the event based on one or both of the video data and the sensor data using onboard hardware at the vehicle; and sending an event detection message from the vehicle to the vehicle management server, the event detection message providing event data associated with the event.

Example 19 is the system of example(s) 18, wherein the operations further comprise: determining, at the vehicle management server, whether to send a data request message to the vehicle based on the event data; and sending the data request message from the vehicle management server to the vehicle.

Example 20 is the system of example(s) 17-19, wherein the one or more machine-learning models include a machine-learning model configured to detect lane lines, traffic signs, or other vehicles in the video data.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIG. 4 illustrates examples of message templates that may be used by a vehicle management server to generate vehicle management messages.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label, irrespective of the suffix.

DETAILED DESCRIPTION OF THE INVENTION

Embodiments of the present disclosure provide for autonomous and real-time extraction and processing of video data from vehicles. Embodiments may be implemented by a vehicle management system that connects multiple vehicles with a vehicle management server via a network. In some embodiments, the vehicle management server employs machine-learning algorithms to analyze the behavior of vehicle drivers during detected events. The events may be detected using onboard hardware installed on each vehicle, and a detected event may cause a series of messages to be communicated between the vehicle and the vehicle management server to determine whether transfer of the video data is to take place. Upon receiving a data request message, the vehicle may send a data message that allows the vehicle management server to access the video data along with any other sensor data captured at the vehicle.

The data messages containing onboard sensor and event data and the location of the associated video or videos related to the event data are fed into a data processor and a data exchange of the vehicle management server. The contents of these data messages are distributed to individual queues using a fan-out configuration. Each queue pushes data to an individual machine-learning model or a sensor data analyzer. The outputs of these components are fed to a vehicle rules engine that applies one or more vehicle rules to construct an event record associated with the event. The event record is used to generate a vehicle management message that is relayed back to the vehicle to reduce the frequency of future events from occurring.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1:
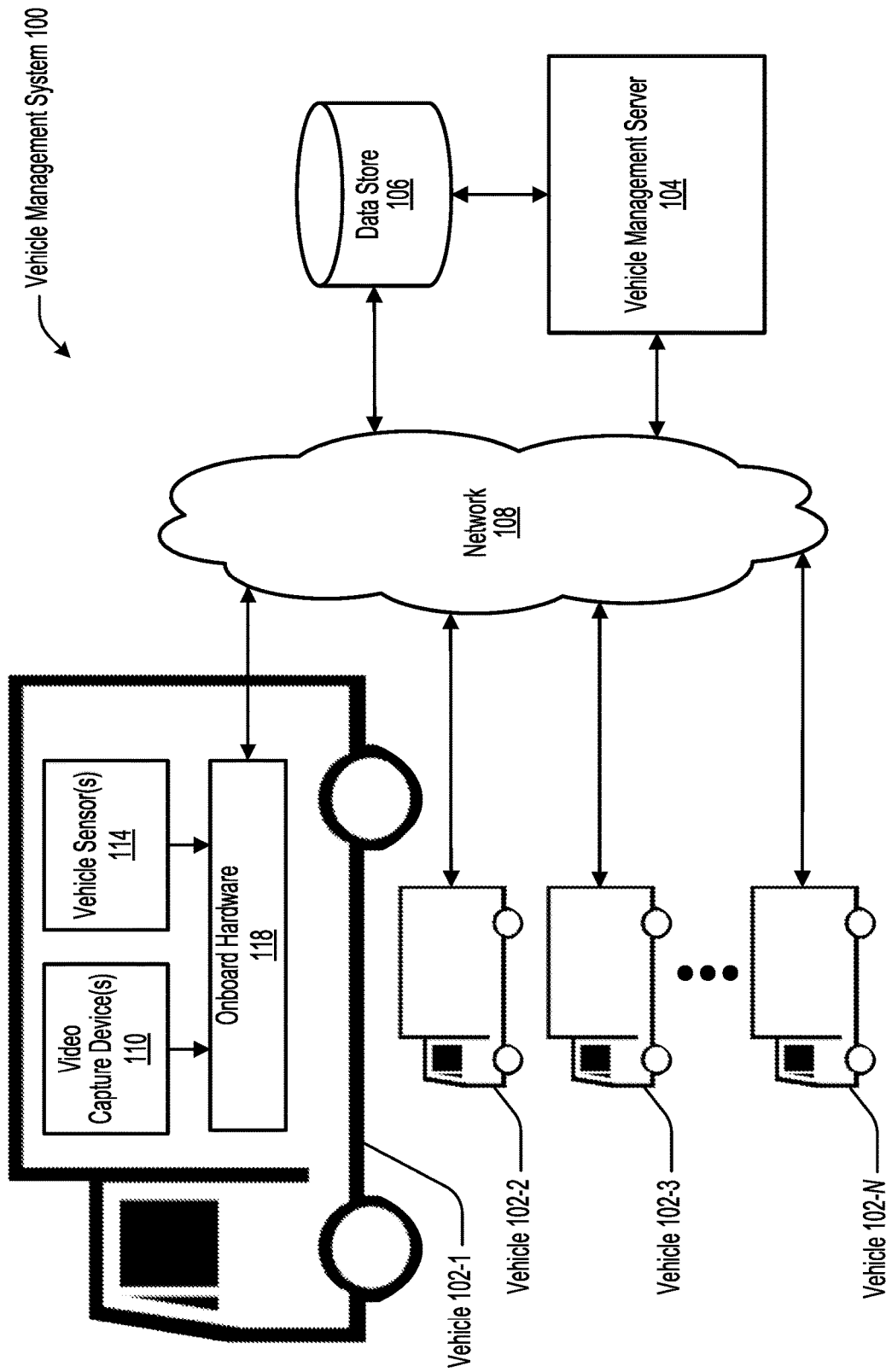
FIG. 1 illustrates an example of a vehicle management system.

FIG. 1 illustrates an example of a vehicle management system 100, in accordance with some embodiments of the present disclosure. Vehicle management system 100 may include a fleet of vehicles 102 that are wirelessly connected to a vehicle management server 104 via a network 108. Vehicle management system 100 may further include a data store 106 for storing video data and/or sensor data captured by vehicles 102. While FIG. 1 shows vehicle management server 104 and data store 106 as being separate elements of vehicle management system 100, in some embodiments the two may be integrated together, i.e., data store 106 may be included in and may be considered to be an element of vehicle management server 104.

In various embodiments, vehicles 102 may comprise cars, trucks, motorcycles, buses, trains, ships, boats, airplanes, among other possibilities. In general, each of vehicles 102 may be any machine that may be operated by one or more persons, alternatively referred to as vehicle drivers. Each of vehicles 102 may include one or more video capture device(s) 110 and one or more vehicle sensor(s) 114. Each of video capture device(s) 110 may be a camera or other device capable of capturing a video or image stream. Video capture device(s) 110 may be mounted to or integrated with vehicles 102 may be oriented in an outward direction such that the captured video includes features surrounding vehicles 102, such as in front, behind, above, below, and/or to the side of vehicles 102. In some embodiments, video capture device(s) 110 may include a front-facing camera oriented in front of a vehicle, a rear-facing camera oriented behind the vehicle, and two side-facing cameras oriented to the left and right of the vehicle.

In addition to video capture device(s) 110, each of vehicles 102 may include one or more vehicle sensor(s) 114, which may be any type of sensor that captures data other than videos or image streams. For example, vehicle sensor(s) 114 may include one or more accelerometers configured to capture acceleration data that is indicative of the acceleration of vehicles 102, one or more gyroscopes configured to capture rotation data that is indicative of the rotation of vehicles 102, one or more Global Navigation Satellite System (GNSS) receivers configured to capture one or more geospatial positions of vehicles 102, among other possibilities. Data captured by vehicle sensor(s) 114, which may be referred to herein as sensor data, may be used to determine a vehicle's position (e.g., geospatial position in three-dimensional coordinates), speed, acceleration, deceleration, turning speed, turning acceleration, among other possibilities. Vehicle sensor(s) 114 may be mounted to or integrated with vehicles 102. In some embodiments, vehicle sensor(s) 114 may be any sensors that capture data indicative of the movement of vehicles 102.

Each of vehicles 102 may include onboard hardware 118 for receiving, sending, and processing data. Onboard hardware 118 may include multiple hardware elements such as processors, memory units, as well as elements for wireless reception and transmission of data, such as antennas and radio-frequency (RF) front ends. In some embodiments, onboard hardware 118 may receive the video data and the sensor data from video capture device(s) 110 and vehicle sensor(s) 114, respectively, and manage the transfer of the data to vehicle management server 104 and/or data store 106.

In some embodiments, vehicle management system 100 achieves interconnectivity between vehicles 102, data store 106, and vehicle management server 104 via a network 108, which may comprise a cellular network, a satellite communications network, a terrestrial microwave network, a wireless wide-area network (WWAN), a wireless local-area network (WLAN), a WiFi network, or any combination thereof. A portion of data used by vehicle management system 100, such as video data, may be transferred via network 108 and stored in data store 106. Vehicle management server 104 may be communicatively coupled to data store 106 via one or more wired and/or wireless connections.

Figure 2:
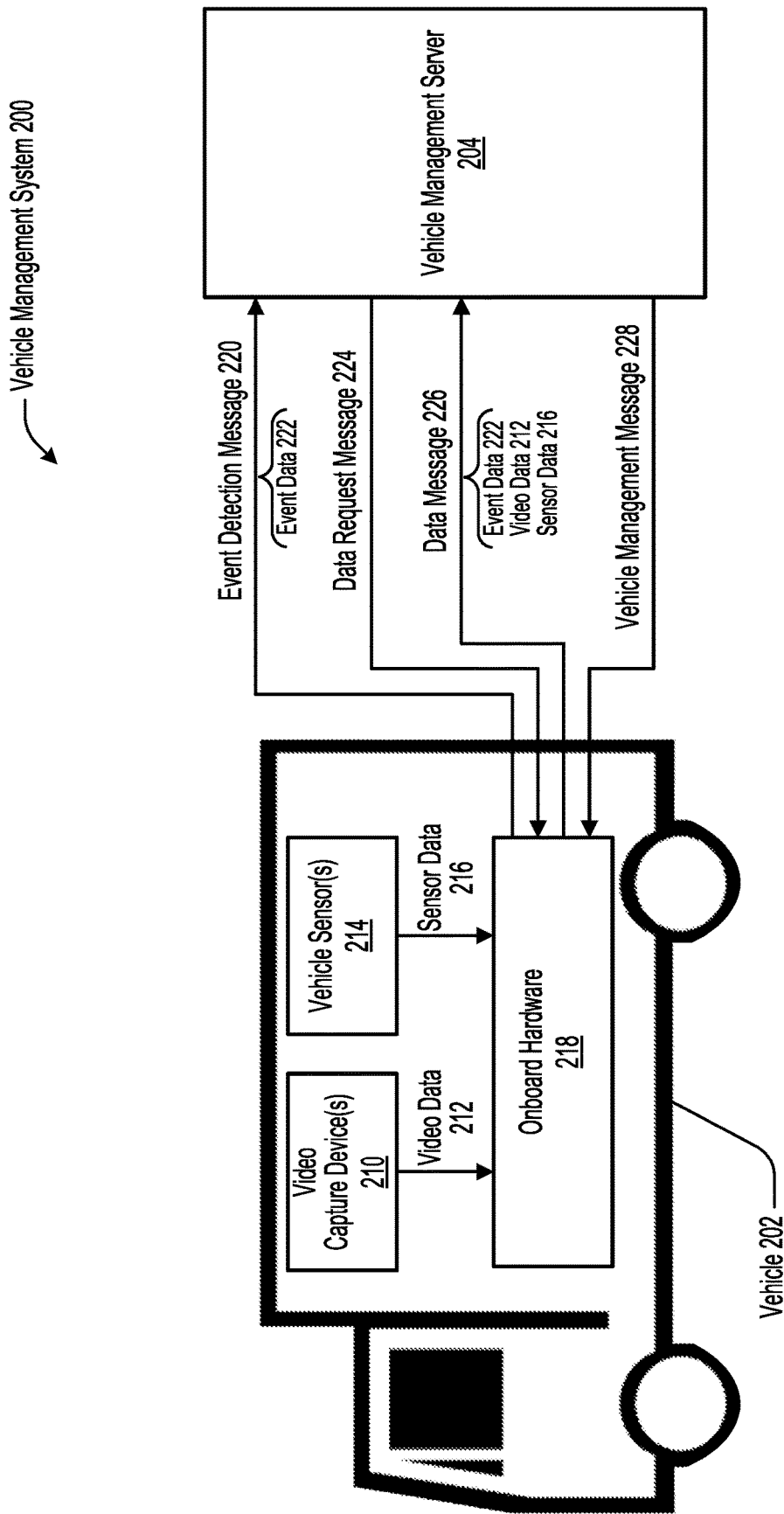
FIG. 2 illustrates an example of a vehicle management system.

FIG. 2 illustrates an example of a vehicle management system 200, in accordance with some embodiments of the present disclosure. Vehicle management system 200 in FIG. 2 may correspond to vehicle management system 100 in FIG. 1. For example, vehicle management system 200 may include a vehicle 202 and a vehicle management server 204. Vehicle 202 may include one or more video capture device(s) 210, one or more vehicle sensor(s) 214, and onboard hardware 218. Video capture device(s) 210 may capture video data 212 and send video data 212 to onboard hardware 218, and vehicle sensor(s) 214 may capture sensor data 216 and send sensor data 216 to onboard hardware 218.

In response to receiving video data 212 and sensor data 216, a processor of onboard hardware 218 may detect whether an event has occurred. In some embodiments, an event occurring may correspond to a particular likelihood that a driver of vehicle 202 has committed an error while driving vehicle 202. For example, an event occurring may correspond to a significant or high likelihood that the driver has committed an error, or a likelihood above a predetermined threshold that the driver has committed an error. In various examples, the error may include: (1) not stopping at a stop sign, (2) having a speed in excess of a speed limit by a particular amount, (3) having a speed below a speed limit by a particular amount, (4) following a vehicle too closely, (5) accelerating or decelerating too quickly, (6) changing lanes too quickly, (7) wandering the vehicle while driving (either into other lanes or within a lane), among other possibilities.

In some embodiments, onboard hardware 218 may solely analyze sensor data 216 (e.g., without analyzing video data 212) to detect whether an event has occurred. For example, onboard hardware 218 may analyze the set of geospatial positions of vehicle 202 to determine that vehicle 202 is likely at or near a stop sign, and may then analyze the acceleration data to determine that vehicle 202 likely failed to come to a complete stop at the stop sign. In another example, onboard hardware 218 may analyze the set of geospatial positions of vehicle 202 to determine that vehicle 202 is likely on the highway, and may then analyze the acceleration data to determine that vehicle 202 is likely exceeding the speed limit of that highway by a predetermined amount.

In some examples, it is detected that an event has occurred in situations where sensor data 216 indicates a particular likelihood that the driver of vehicle 202 has committed an error while driving vehicle 202, however a close analysis of video data 212 would be needed to fully determine that an error has indeed been committed. For example, onboard hardware 218 may analyze the rotation data outputted by one or more gyroscopes to determine that the driver of vehicle 202 has made an abrupt turn while driving on the highway. To fully determine whether the abrupt turn corresponds to a driver error, video data 212 would need to be closely examined to determine whether conditions on the highway merited the abrupt turn (e.g., vehicle 202 was cut off by another vehicle, an object landed on the road, etc.) or whether the abrupt turn was a driver error.

In response to detecting that an event has occurred, onboard hardware 218 may generate an event detection message 220 and may send event detection message 220 to vehicle management server 204. Event detection message 220 may indicate that the event has occurred. For example, event detection message 220 may include event data 222 that identifies the vehicle (e.g., using a vehicle ID, e.g., "Vehicle #803"), identifies the event (e.g., using an event ID, e.g., "Event #10038"), identifies an event type (e.g., "Speeding", "Stop Sign", "Abrupt Turn", etc.), and optionally includes additional data about the event, such as the time that the event was detected, the location of vehicle 202 when the event was detected, the driver of vehicle 202, among other possibilities.

In response to receiving event detection message 220, vehicle management server 204 may extract event data 222 from event detection message 220 and may determine whether to send a data request message 224 to vehicle 202 based on event data 222. In some embodiments, vehicle management server 204 may use event data 222 to increment a counter associated with the event type so as to track the frequency of occurrence of the different event types (e.g., incrementing the counter for the "Speeding" event type from four to five). Event types having a counter above a particular threshold may cause data request message 224 to be sent to vehicle 202, whereas event types having a counter below the particular threshold may only cause the counter to be incremented without data request message 224 being sent. In some embodiments, vehicle management server 204 may use event data 222 to determine whether the events type is one that vehicle management system 200 is interested in correcting. For example, event data 222 indicating a "Speeding" event type may cause data request message 224 to be sent while a "Stop Sign" event type may not cause data request message 224 to be sent. In some embodiments, event detection message 220 may further include sensor data 216, which may also be used to determine whether to send data request message 224.

In response to receiving data request message 224, onboard hardware 218 may cause a data message 226 to be sent to vehicle management server 204. Data message 226 may allow vehicle management server 204 to access video data 212, sensor data 216, and/or event data 222. For example, in some embodiments, data message 226 may directly include video data 212 and/or sensor data 216 as the message payload. As another example, in some embodiments, data message 226 may provide the memory locations of video data 212 and/or sensor data 216 within a data store (e.g., data store 106). For example, in some implementations, the size of video data 212 may prevent it from being sent directly to vehicle management server 204. As another example, in some implementations, video data 212 may not be sent directly to vehicle management server 204 for data security reasons.

In response to receiving data message 226, vehicle management server 204 may perform various operations on video data 212, sensor data 216, and/or event data 222 to determine whether to send a vehicle management message 228 to vehicle 202. As described further herein, vehicle management server 204 may process video data 212 using various machine-learning models to construct an event record associated with the event. The event record may include a determination of whether the driver of vehicle 202 has committed an error while driving vehicle 202. In some embodiments, if it is determined that the driver of vehicle 202 has committed an error, vehicle management server 204 may generate and send vehicle management message 228 that notifies the driver regarding the error and optionally provides instructions or coaching for preventing future errors from being committed.

Figure 3:
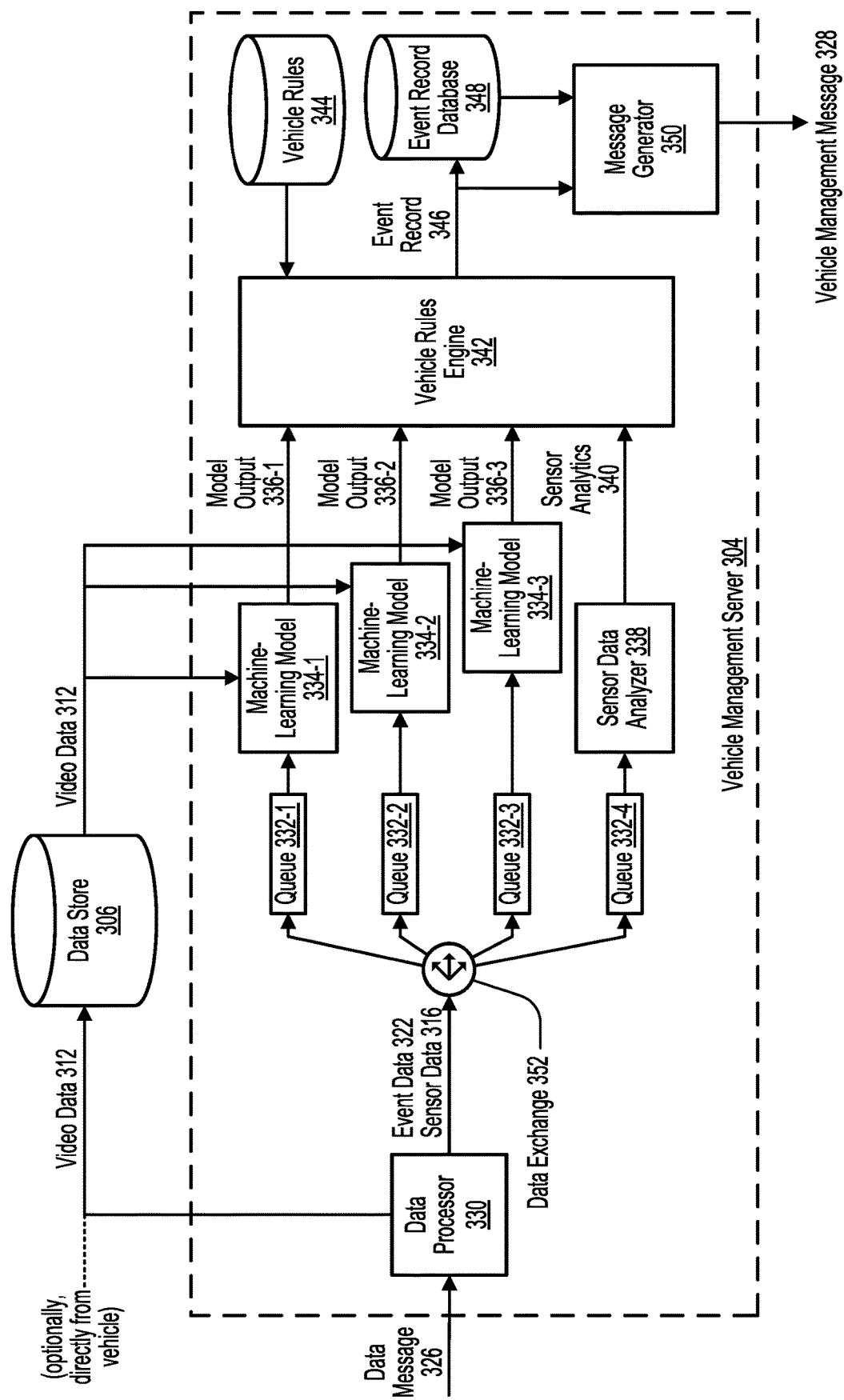
FIG. 3 illustrates an example architecture of a vehicle management server.

FIG. 3 illustrates an example architecture of a vehicle management server 304, in accordance with some embodiments of the present disclosure. Vehicle management server 304 in FIG. 3 may correspond to vehicle management servers 104 and 204 in FIGS. 1 and 2, respectively. For example, vehicle management server 304 may receive a data message 326 from a vehicle that provides access to video data 312, sensor data 316, and/or event data 322. In the illustrated example, vehicle management server 304 includes a data processor 330 that filters the incoming data by, for example, sending video data 312 to a data store 306 for storage and sending event data 322 and sensor data 316 to a data exchange 352.

In response to receiving event data 322 and sensor data 316, data exchange 352 may load event data 322 and sensor data 316 into one or more of queues 332. In the illustrated example, event data 322 is loaded into a first queue 332-1 to be sent to a first machine learning-model 334-1. Using event data 322 and/or a memory location, video data 312 may be retrieved from data store 306 and may be provided to first machine-learning model 334-1. Similarly, event data 322 may also be loaded into a second queue 332-2 to be sent to a second machine learning-model 334-2, and video data 312 may be retrieved from data store 306 and may be provided to second machine-learning model 334-2. Similarly, event data 322 may also be loaded into a third queue 332-3 to be sent to a third machine learning-model 334-3, and video data 312 may be retrieved from data store 306 and may be provided to third machine-learning model 334-3.

Machine-learning models 334 may be configured to generate model outputs 336 based on video data 312, and each of machine-learning models 334 may be configured to perform a different task using video data 312. For example, first machine-learning model 334-1 may be configured to identify traffic signs in video data 312 by, for example, determining the type of each identified traffic sign (e.g., stop sign, yield sign, etc.) and the location (e.g., X and Y coordinates within the video) of each identified traffic sign. As another example, second machine-learning model 334-2 may be configured to identify lane lines in video data 312 by, for example, determining the sets of X and Y coordinates within the video that define each identified lane line. As another example, third machine-learning model 334-3 may be configured to identify objects in video data 312 by, for example, determining the type of each identified object (e.g., other vehicle, person, side walk, etc.) and the location (e.g., X and Y coordinates within the video) of each identified object.

Machine-learning models 334 may be pre-trained to perform the above-described tasks. For example, first machine-learning model 334-1 may be pre-trained to identify traffic signs using training data comprising videos of labeled traffic signs, second machine-learning model 334-2 may be pre-trained to identify lane lines using training data comprising videos of labeled lane lines, and third machine-learning model 334-3 may be pre-trained to identify objects using training data comprising videos of labeled objects. Each of machine-learning models 334 may be any one of a wide variety of machine-learning models, such as artificial neural networks, support-vector machines, Bayesian networks, among other possibilities. Training of machine-learning models 334 may utilize any one of a wide variety of techniques, including supervised learning, unsupervised learning, semi-supervised learning, reinforcement learning, among other possibilities.

Data exchange 352 may cause sensor data 316 to be loaded into a fourth queue 332-4 to be sent to a sensor data analyzer 338. In some embodiments, sensor data analyzer 338 may generate sensor analytics 340 based on sensor data 316. Sensor analytics 340 may include additional metrics that are derived from sensor data 316. For example, sensor analytics 340 may include a recreation of the movement of the vehicle at a window surrounding the time the event was detected based on, for example, the acceleration data captured by the accelerometer and the rotation data captured by the gyroscope. As another example, sensor analytics 340 may include a comparison of the vehicle's speed to posted speed limits at a window surrounding the time the event was detected.

Vehicle management server 304 may include a vehicle rules engine 342 that receives model outputs 336 and sensor analytics 340, either directly or from a data store in which model outputs 336 and sensor analytics 340 are stored, and generates an event record 346 associated with the event based on model outputs 336 and sensor analytics 340 and using a set of vehicle rules 344. Vehicle rules engine 342 may, for example, apply vehicle rules 344 to model outputs 336 and sensor analytics 340 to make a determination of whether the driver of the vehicle has committed an error. For example, vehicle rules 344 may stipulate that an error has been committed when (1) model output 336-1 indicates that a stop sign has been identified at the location where the event was detected, (2) sensor analytics 340 indicate that the vehicle did not come to a complete stop at the location where the event was detected, and (3) model output 336-3 indicates that at least one other vehicle was near the vehicle where the event was detected.

As another example, vehicle rules 344 may stipulate that an error has been committed when (1) model output 336-3 indicates that the vehicle was following another vehicle at a particular following distance at the location where the event was detected and (2) sensor analytics 340 indicate that the vehicle was traveling at a speed that is too high for the following distance at the location where the event was detected. As another example, vehicle rules 344 may stipulate that an error has been committed when (1) sensor analytics 340 indicate that the vehicle was traveling in excess of the speed limit at the location where the event was detected and (2) model output 336-3 indicates that at least one other vehicle was near the vehicle where the event was detected.

In various embodiments, different vehicle rules 344 may be utilized by vehicle rules engine 342 based the event type associated with the event. For example, vehicle rules engine 342 may examine event data 222 to identify the event type (e.g., "Speeding", "Stop Sign", "Abrupt Turn", etc.) and may retrieve a particular set of vehicle rules 344 that are relevant to the identified event type. Vehicle rules engine 342 may then move through each of the retrieved set of vehicle rules 344 to determine whether each vehicle rule, when applied to model outputs 336 and sensor analytics 340, indicate that the driver committed an error. In various embodiments, it may be determined that the driver committed no errors, a single error, or multiple errors, which may be reflected in event record 346.

In some embodiments, vehicle rules engine 342 may construct event record 346 to include the vehicle ID associated with the vehicle, the driver of the vehicle, the event ID associated with the event, the event type, the time/date of the event, the location of the event, and an entry for each of vehicle rules 344 that was applied to the input data (model outputs 336 and sensor analytics 340). Each entry may indicate whether or not the driver committed an error in view of the corresponding vehicle rule as well as the relevant data from model outputs 336 and sensor analytics 340 that support the determination. For example, an event record may include a first entry that indicates that the driver committed an error by speeding and further provides the driver's actual speed, the posted speed limit, the difference between the actual speed and the speed limit, the location where the speeding took place, the number and/or proximity of other vehicles near the vehicle, among other possibilities. Continuing with the above example, the event record may also include a second entry that indicates that the driver did not commit an error by following another vehicle too closely and further provides the distance between the vehicle and the closest vehicle in front of the vehicle.

In some embodiments, each event record 346 that is constructed by vehicle rules engine 342 may be stored in an event record database 348. Vehicle management server 304 may include a message generator 350 that receives event record 346 and generates a vehicle management message 328 based on event record 346. In some embodiments, message generator 350 may further obtain other event records stored in event record database 348 having the same vehicle ID, driver name, and/or event type as event record 346. Message generator 350 may analyze event record 346 to select a message template and may fill in the message template with information from event record 346. Vehicle management message 328 may be generated so as to notify the driver of the vehicle regarding any errors committed by the driver as indicated in event record 346 and may provide coaching for preventing future errors from being committed.

FIG. 4 illustrates examples of message templates 454 that may be used by a vehicle management server to generate a vehicle management message, in accordance with some embodiments of the present disclosure. In some embodiments, a message generator of the vehicle management server may select one or more of message templates 454 to fill in with information from the event record. For example, if the event record indicates that any error was committed, the message generator may select message template 454-1 and may fill in <Driver Name> with the vehicle driver's name from the event record. As another example, if the event record indicates that errors were committed related to following too closely and speeding, the message generator may select message template 454-2 and may fill in <Time/Date>, <Seconds Following Distance>, <Seconds Following Time>, and <MPH> with the relevant information from the event record.

Figure 5:
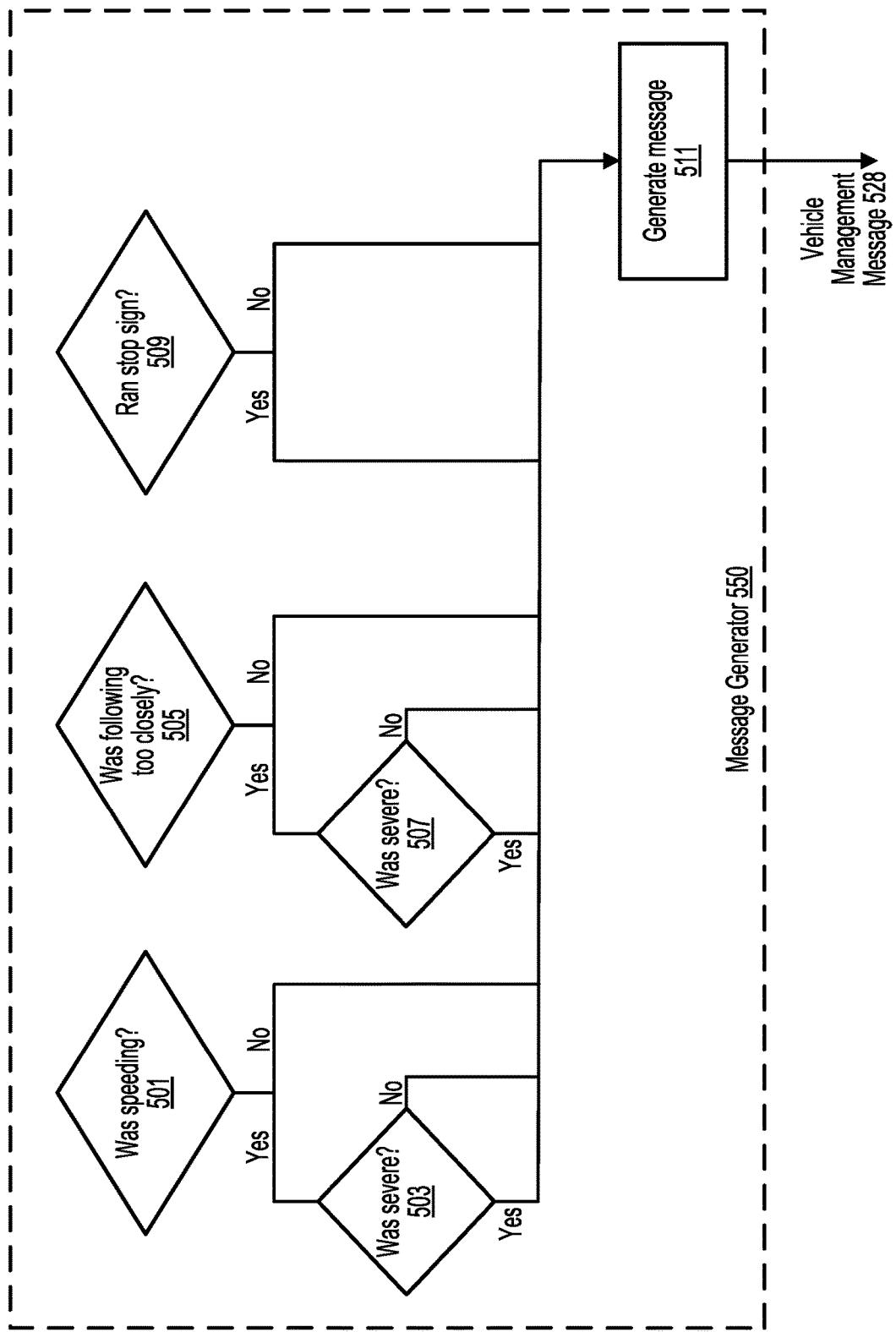
FIG. 5 illustrates examples of steps that may be performed by a message generator to generate vehicle management messages.

FIG. 5 illustrates examples of steps that may be performed by a message generator 550 to generate a vehicle management message 528, in accordance with some embodiments of the present disclosure. Message generator 550 may receive one or more event records and may perform one or more of steps 501 to 511 based on the event record(s). At step 501, message generator 550 determines whether the vehicle was speeding. If the vehicle is determined to be speeding, then at step 503, message generator 550 determines whether the speeding was severe (e.g., difference between actual speed and posted speed limit is substantial). At step 505, message generator 550 determines whether the vehicle was following too closely. If the vehicle is determined to be following too closely, then at step 507, message generator 550 determines whether the following too closely was severe (e.g., distance between vehicles is small compared to speeds of vehicles). At step 509, message generator 550 determines whether the vehicle ran a stop sign. At step 511, message generator 550 generates vehicle management message 528 based on the results of steps 501 to 509.

Figure 6A:
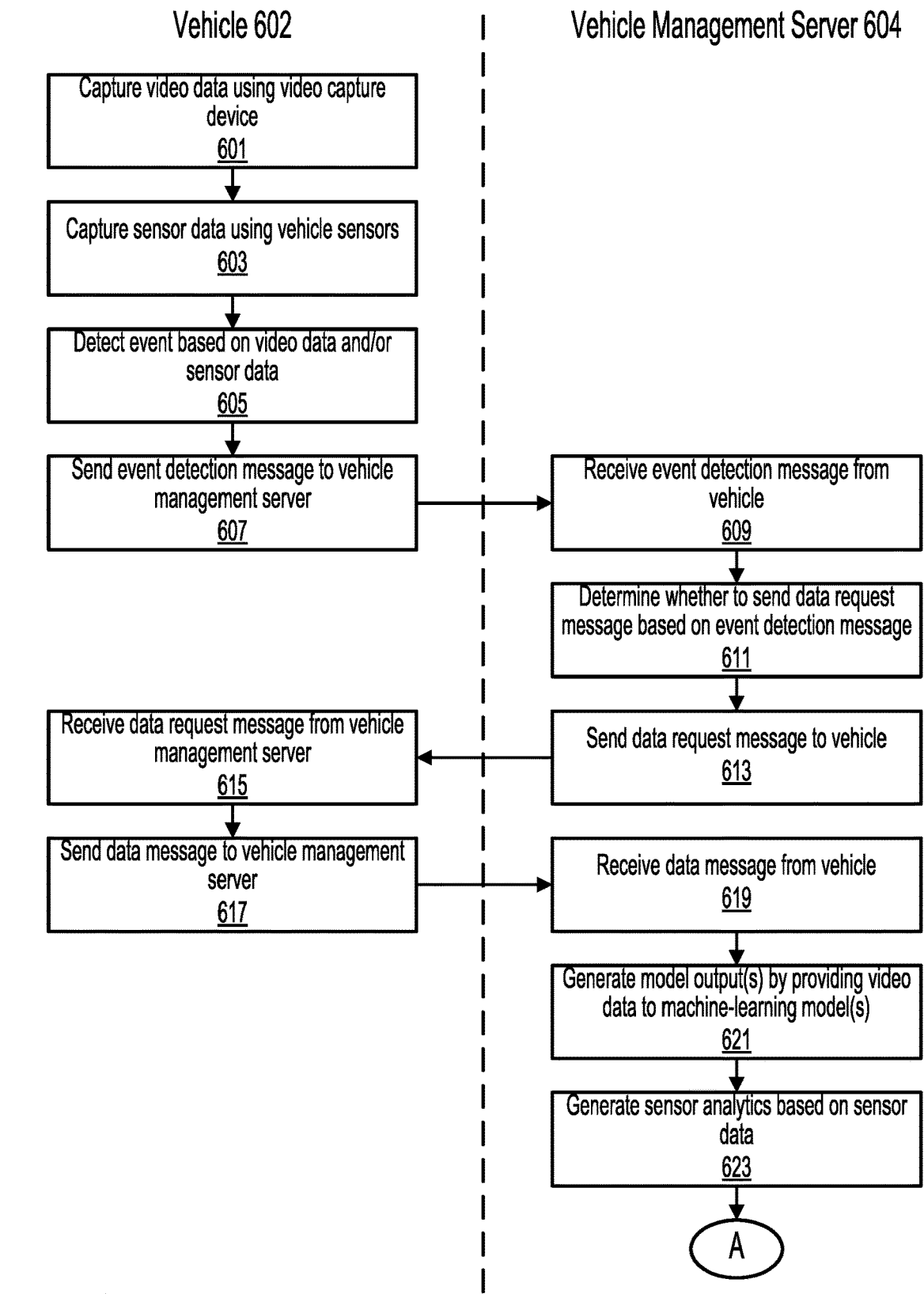
FIGS. 6A and 6B illustrate a method implemented by a vehicle management system.
Figure 6B:
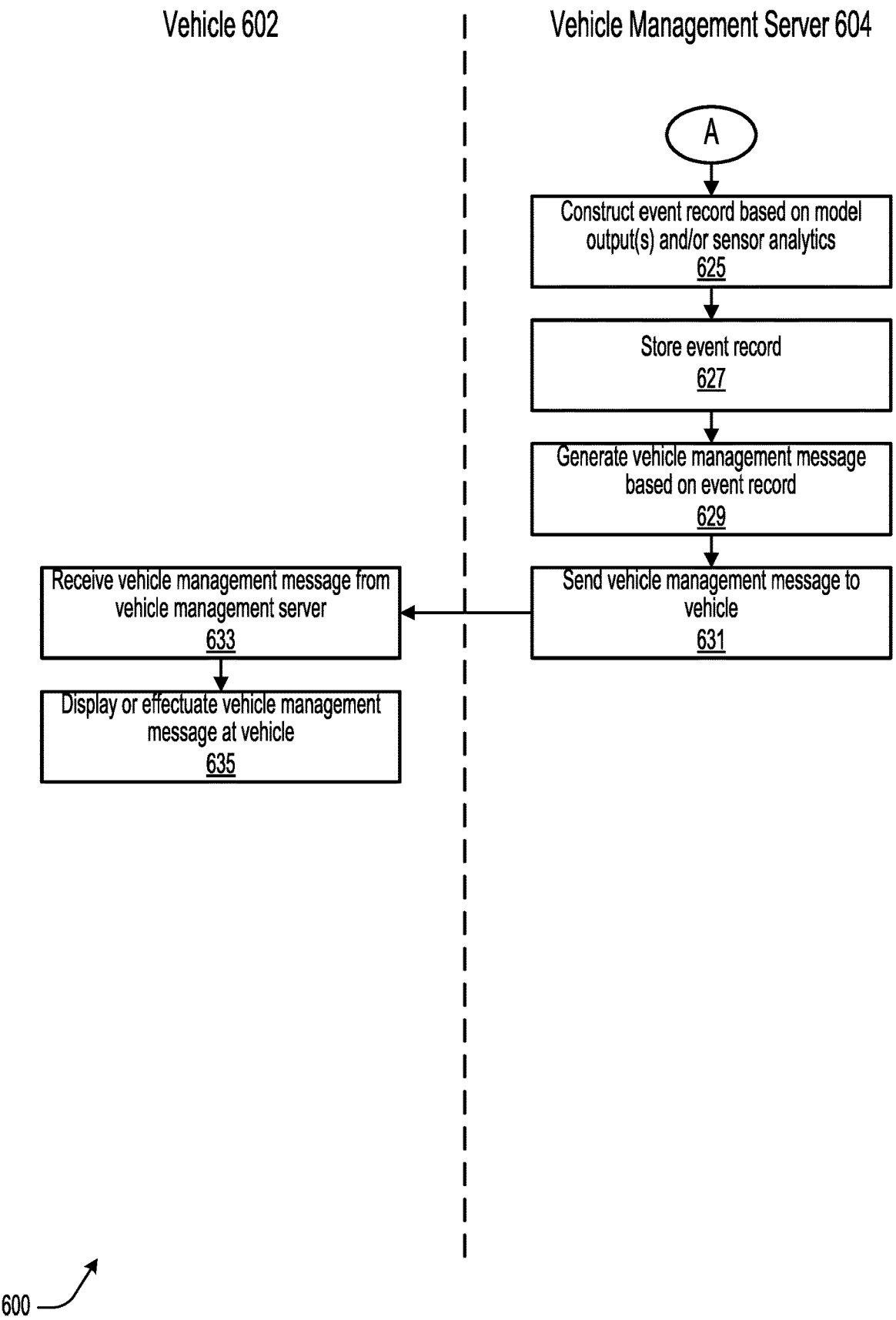

FIGS. 6A and 6B illustrate a method implemented by a vehicle management system (e.g., vehicle management systems 100, 200), in accordance with some embodiments of the present disclosure. One or more steps of method 600 may be omitted during performance of method 600, and steps of method 600 may be performed in any order and/or in parallel. One or more steps of method 600 may be performed by either a vehicle 602 or a vehicle management server 604, as illustrated in FIGS. 6A and 6B. Method 600 may be implemented as a computer-readable medium or computer program product comprising instructions which, when the program is executed by one or more computers, cause the one or more computers to carry out the steps of method 600.

At step 601, video data (e.g., video data 212, 312) is captured using a video capture device (e.g., video capture devices 110, 210) at a vehicle (e.g., vehicles 102, 202, 602).

At step 603, sensor data (e.g., sensor data 216, 316) is captured using one or more vehicle sensors (e.g., vehicle sensors 114, 214) at the vehicle. The one or more vehicle sensors may include an accelerometer, a gyroscope, or a GNSS receiver. The sensor data may include acceleration data captured by the accelerometer, rotation data captured by the gyroscope, and/or one or more geospatial locations of the vehicle captured by the GNSS receiver.

At step 605, an event is detected based on one or both of the video data and the sensor data using onboard hardware (e.g., onboard hardware 218) at the vehicle. Event data (e.g., event data 222, 322) associated with the event may be generated using the onboard hardware in response to detecting the event.

At step 607, an event detection message (e.g., event detection message 220) is sent from the vehicle to a vehicle management server (e.g., vehicle management servers 104, 204, 304, 604). The event detection message may provide the event data associated with the event.

At step 609, the event detection message is received at the vehicle management server from the vehicle.

At step 611, it is determined whether to send a data request message (e.g., data request message 224) to the vehicle based on the event data.

At step 613, the data request message is sent from the vehicle management server to the vehicle.

At step 615, the data request message is received at the vehicle from the vehicle management server.

At step 617, a data message (e.g., data messages 226, 326) is sent from the vehicle to the vehicle management server. The data message may allow the vehicle management server to access the video data, the sensor data, and/or the event data. The data message may directly include the video data, the sensor data, and/or the event data. The video data may be sent directly to and stored in a data store (e.g., data store 106) that is separate from or is integrated with the vehicle management server and is accessible by the vehicle management server. The data message may indicate a memory location of the video data in the data store.

At step 619, the data message is received at the vehicle management server from the vehicle.

At step 621, one or more model outputs (e.g., model outputs 336) are generated by providing the video data to one or more machine-learning models (e.g., machine-learning models 334). The one or more machine-learning models may be artificial neural networks. The one or more machine-learning models may include machine-learning models configured to detect lane lines, traffic signs, or other vehicles in the video data.

At step 623, sensor analytics (e.g., sensor analytics 340) are generated based on the sensor data. The sensor analytics may be generated by a sensor data analyzer (e.g., sensor data analyzer 338) of the vehicle management server.

At step 625, an event record (e.g., event record 346) associated with the event is constructed based on the one or more model outputs and/or the sensor data. The event record may be constructed by a vehicle rules engine (e.g., vehicle rules engine 342) of the vehicle management server. The event record may be constructed by applying one or more vehicle rules (e.g., vehicle rules 344) to the one or more model outputs and/or the sensor analytics.

At step 627, the event record is stored. The event record may be stored in an event record database (e.g., event record database 348).

At step 629, a vehicle management message (e.g., vehicle management messages 228, 328, 528) is generated based on the event record. The vehicle management message may be generated by a message generator (e.g., message generators 350, 550) of the vehicle management server.

At step 631, the vehicle management message is sent from the vehicle management server to the vehicle.

At step 633, the vehicle management message is received at the vehicle from the vehicle management server.

At step 635, the vehicle management message is displayed or effectuated at the vehicle. The vehicle management message may be displayed at a display at the vehicle. In some embodiments, the vehicle management message may be displayed at a portable electronic device held by the driver of the vehicle. The vehicle management message may be effectuated at the vehicle by modifying the operation of the vehicle based on the vehicle management message.

Figure 7:
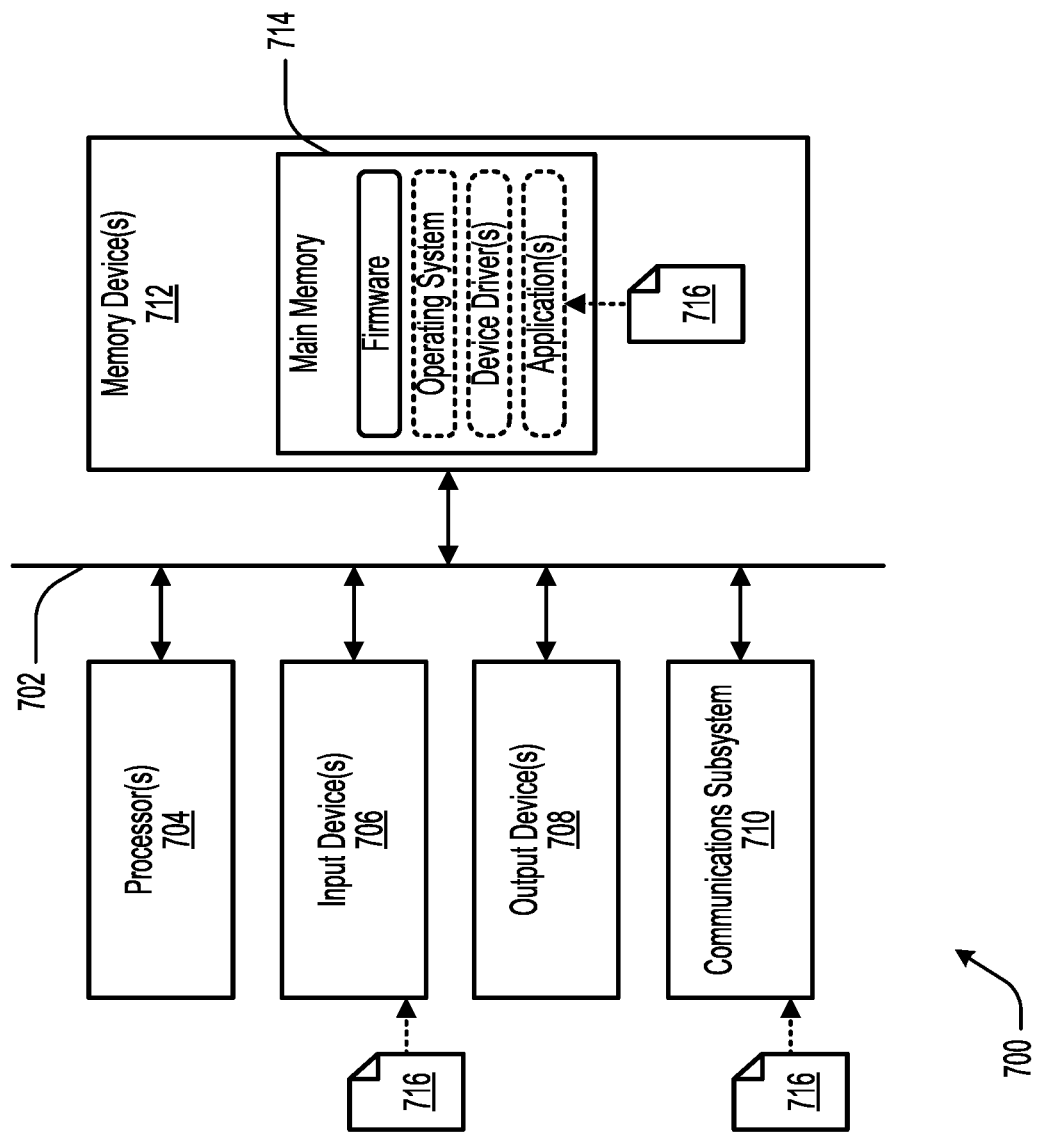
FIG. 7 illustrates an example computer system comprising various hardware elements.

FIG. 7 illustrates an example computer system 700 comprising various hardware elements, in accordance with some embodiments of the present disclosure. Computer system 700 may be incorporated into or integrated with devices described herein and/or may be configured to perform some or all of the steps of the methods provided by various embodiments. For example, in various embodiments, computer system 700 may be incorporated into onboard hardware 218 or the vehicle management servers 104, 204, 304, 604 and/or may be configured to perform method 600. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

In the illustrated example, computer system 700 includes a communication medium 702, one or more processor(s) 704, one or more input device(s) 706, one or more output device(s) 708, a communications subsystem 710, and one or more memory device(s) 712. Computer system 700 may be implemented using various hardware implementations and embedded system technologies. For example, one or more elements of computer system 700 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 700 may be communicatively coupled via communication medium 702. While communication medium 702 is illustrated as a single connection for purposes of clarity, it should be understood that communication medium 702 may include various numbers and types of communication media for transferring data between hardware elements. For example, communication medium 702 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 702 may include one or more buses connecting pins of the hardware elements of computer system 700. For example, communication medium 702 may include a bus that connects processor(s) 704 with main memory 714, referred to as a system bus, and a bus that connects main memory 714 with input device(s) 706 or output device(s) 708, referred to as an expansion bus. The system bus may itself consist of several buses, including an address bus, a data bus, and a control bus. The address bus may carry a memory address from processor(s) 704 to the address bus circuitry associated with main memory 714 in order for the data bus to access and carry the data contained at the memory address back to processor(s) 704. The control bus may carry commands from processor(s) 704 and return status signals from main memory 714. Each bus may include multiple wires for carrying multiple bits of information and each bus may support serial or parallel transmission of data.

Processor(s) 704 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 704 may include one or more multi-core processors, in which each core may read and execute program instructions concurrently with the other cores, increasing speed for programs that support multithreading.

Input device(s) 706 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 706 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 708 may include one or more of various devices that convert information into human-readable form, such as without limitation a display device, a speaker, a printer, a haptic or tactile device, and/or the like. Output device(s) 708 may also include devices for writing to removable storage devices or other removable media, such as those described in reference to input device(s) 706. Output device(s) 708 may also include various actuators for causing physical movement of one or more components. Such actuators may be hydraulic, pneumatic, electric, and may be controlled using control signals generated by computer system 700.

Communications subsystem 710 may include hardware components for connecting computer system 700 to systems or devices that are located external to computer system 700, such as over a computer network. In various embodiments, communications subsystem 710 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 712 may include the various data storage devices of computer system 700. For example, memory device(s) 712 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 704 and memory device(s) 712 are illustrated as being separate elements, it should be understood that processor(s) 704 may include varying levels of on-processor memory, such as processor registers and caches that may be utilized by a single processor or shared between multiple processors.

Memory device(s) 712 may include main memory 714, which may be directly accessible by processor(s) 704 via the memory bus of communication medium 702. For example, processor(s) 704 may continuously read and execute instructions stored in main memory 714. As such, various software elements may be loaded into main memory 714 to be read and executed by processor(s) 704 as illustrated in FIG. 7. Typically, main memory 714 is volatile memory, which loses all data when power is turned off and accordingly needs power to preserve stored data. Main memory 714 may further include a small portion of non-volatile memory containing software (e.g., firmware, such as BIOS) that is used for reading other software stored in memory device(s) 712 into main memory 714. In some embodiments, the volatile memory of main memory 714 is implemented as RAM, such as dynamic random-access memory (DRAM), and the non-volatile memory of main memory 714 is implemented as read-only memory (ROM), such as flash memory, erasable programmable read-only memory (EPROM), or electrically erasable programmable read-only memory (EEPROM).

Computer system 700 may include software elements, shown as being currently located within main memory 714, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 716, which are executable by computer system 700. In one example, such instructions 716 may be received by computer system 700 using communications subsystem 710 (e.g., via a wireless or wired signal that carries instructions 716), carried by communication medium 702 to memory device(s) 712, stored within memory device(s) 712, read into main memory 714, and executed by processor(s) 704 to perform one or more steps of the described methods. In another example, instructions 716 may be received by computer system 700 using input device(s) 706 (e.g., via a reader for removable media), carried by communication medium 702 to memory device(s) 712, stored within memory device(s) 712, read into main memory 714, and executed by processor(s) 704 to perform one or more steps of the described methods.

In some embodiments of the present disclosure, instructions 716 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 700. For example, the non-transitory computer-readable medium may be one of memory device(s) 712 (as shown in FIG. 7). In some cases, the non-transitory computer-readable medium may be separate from computer system 700. In one example, the non-transitory computer-readable medium may be a removable medium provided to input device(s) 706 (as shown in FIG. 7), such as those described in reference to input device(s) 706, with instructions 716 being read into computer system 700 by input device(s) 706. In another example, the non-transitory computer-readable medium may be a component of a remote electronic device, such as a mobile phone, that may wirelessly transmit a data signal that carries instructions 716 to computer system 700 and that is received by communications subsystem 710 (as shown in FIG. 7).

Instructions 716 may take any suitable form to be read and/or executed by computer system 700. For example, instructions 716 may be source code (written in a human-readable programming language such as Java, C, C++, C #, Python), object code, assembly language, machine code, microcode, executable code, and/or the like. In one example, instructions 716 are provided to computer system 700 in the form of source code, and a compiler is used to translate instructions 716 from source code to machine code, which may then be read into main memory 714 for execution by processor(s) 704. As another example, instructions 716 are provided to computer system 700 in the form of an executable file with machine code that may immediately be read into main memory 714 for execution by processor(s) 704. In various examples, instructions 716 may be provided to computer system 700 in encrypted or unencrypted form, compressed or uncompressed form, as an installation package or an initialization for a broader software deployment, among other possibilities.

In one aspect of the present disclosure, a system (e.g., computer system 700) is provided to perform methods in accordance with various embodiments of the present disclosure. For example, some embodiments may include a system comprising one or more processors (e.g., processor(s) 704) that are communicatively coupled to a non-transitory computer-readable medium (e.g., memory device(s) 712 or main memory 714). The non-transitory computer-readable medium may have instructions (e.g., instructions 716) stored therein that, when executed by the one or more processors, cause the one or more processors to perform the methods described in the various embodiments.

In another aspect of the present disclosure, a computer-program product that includes instructions (e.g., instructions 716) is provided to perform methods in accordance with various embodiments of the present disclosure. The computer-program product may be tangibly embodied in a non-transitory computer-readable medium (e.g., memory device(s) 712 or main memory 714). The instructions may be configured to cause one or more processors (e.g., processor(s) 704) to perform the methods described in the various embodiments.

In another aspect of the present disclosure, a non-transitory computer-readable medium (e.g., memory device(s) 712 or main memory 714) is provided. The non-transitory computer-readable medium may have instructions (e.g., instructions 716) stored therein that, when executed by one or more processors (e.g., processor(s) 704), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method comprising:
   capturing video data using a video capture device at a vehicle;
   capturing sensor data using one or more vehicle sensors at the vehicle;
   detecting, at the vehicle, an event based on one or both of the video data and the sensor data;
   sending an event detection message from the vehicle to a vehicle management server, the event detection message providing event data associated with the event;
   based on the event data, requesting, by the vehicle management server, the video data and the sensor data from the vehicle;
   sending a data message from the vehicle to the vehicle management server, the data message allowing the vehicle management server to access the video data and the sensor data;

generating one or more model outputs by providing the video data to one or more machine-learning models at the vehicle management server;

constructing an event record associated with the event based on the one or more model outputs using a vehicle rules engine at the vehicle management server, wherein the vehicle rules engine is configured to apply one or more vehicle rules to the one or more model outputs;

generating a vehicle management message based on the event record; and sending the vehicle management message from the vehicle management server to the vehicle.

2. The computer-implemented method of claim 1, wherein the event is detected using onboard hardware at the vehicle.

3. The computer-implemented method of claim 1, further comprising:

determining, at the vehicle management server, whether to send a data request message to the vehicle based on the event data; and sending the data request message from the vehicle management server to the vehicle.

4. The computer-implemented method of claim 3, wherein the data message is sent by the vehicle in response to the vehicle receiving the data request message.

5. The computer-implemented method of claim 1, wherein the one or more machine-learning models include a machine-learning model configured to detect lane lines, traffic signs, or other vehicles in the video data.

6. The computer-implemented method of claim 1, wherein the video data is retrieved from the vehicle and stored in a data store that is separate from the vehicle management server, and wherein the data message indicates a location of the video data in the data store.

7. The computer-implemented method of claim 1, wherein the one or more vehicle sensors include an accelerometer or a GNSS receiver, and wherein the sensor data includes acceleration data captured by the accelerometer or a geospatial location of the vehicle captured by the GNSS receiver.

8. The computer-implemented method of claim 1, wherein the event record is constructed further based on the sensor data.

9. A vehicle management system comprising:

a vehicle management server; and one or more vehicles communicatively coupled to the vehicle management server, wherein each vehicle of the one or more vehicles is configured to:

capture video data using a video capture device at the vehicle;

capture sensor data using one or more vehicle sensors at the vehicle;

detect, at the vehicle, an event based on one or both of the video data and the sensor data;

send an event detection message from the vehicle to the vehicle management server, the event detection message providing event data associated with the event; and send a data message to the vehicle management server, the data message allowing the vehicle management server to access the video data and the sensor data;

wherein the vehicle management server is configured to:

based on the event data, request the video data and the sensor data from the vehicle;

generate one or more model outputs by providing the video data to one or more machine-learning models at the vehicle management server;

construct an event record associated with the event based on the one or more model outputs using a vehicle rules engine at the vehicle management server, wherein the vehicle rules engine is configured to apply one or more vehicle rules to the one or more model outputs;

generate a vehicle management message based on the event record; and send the vehicle management message to the vehicle.

10. The vehicle management system of claim 9, wherein the event is detected using onboard hardware at the vehicle.

11. The vehicle management system of claim 9, wherein the vehicle management server is further configured to:

determine whether to send a data request message to the vehicle based on the event data; and send the data request message to the vehicle.

12. The vehicle management system of claim 11, wherein the data message is sent by the vehicle in response to the vehicle receiving the data request message.

13. The vehicle management system of claim 9, wherein the one or more machine-learning models include a machine-learning model configured to detect lane lines, traffic signs, or other vehicles in the video data.

14. The vehicle management system of claim 9, wherein the video data is retrieved from the vehicle and stored in a data store that is separate from the vehicle management server, and wherein the data message indicates a location of the video data in the data store.

15. The vehicle management system of claim 9, wherein the one or more vehicle sensors include an accelerometer or a GNSS receiver, and wherein the sensor data includes acceleration data captured by the accelerometer or a geospatial location of the vehicle captured by the GNSS receiver.

16. The vehicle management system of claim 9, wherein the event record is constructed further based on the sensor data.

17. A system comprising, one or more processors; and one or more computer-readable media comprising instructions that, when executed by the one or more processors, cause the one or more processors to perform operations comprising:

capturing video data using a video capture device at a vehicle;

capturing sensor data using one or more vehicle sensors at the vehicle;

detecting, at the vehicle, an event based on one or both of the video data and the sensor data;

sending an event detection message from the vehicle to a vehicle management server, the event detection message providing event data associated with the event;

based on the event data, requesting, by the vehicle management server, the video data and the sensor data from the vehicle;

sending a data message from the vehicle to the vehicle management server, the data message allowing the vehicle management server to access the video data and the sensor data;

generating one or more model outputs by providing the video data to one or more machine-learning models at the vehicle management server;

constructing an event record associated with the event based on the one or more model outputs using a vehicle rules engine at the vehicle management server, wherein the vehicle rules engine is configured to apply one or more vehicle rules to the one or more model outputs;

generating a vehicle management message based on the event record; and sending the vehicle management message from the vehicle management server to the vehicle.

18. The system of claim 17, wherein
the event is detected based using onboard hardware at the vehicle.

19. The system of claim 17, wherein the operations further comprise:

determining, at the vehicle management server, whether to send a data request message to the vehicle based on the event data; and sending the data request message from the vehicle management server to the vehicle.

20. The system of claim 17, wherein the one or more machine-learning models include a machine-learning model configured to detect lane lines, traffic signs, or other vehicles in the video data.

\* \* \* \* \*